June 13, 1939.  G. KJELLSSON  2,162,583
NASAL PASSAGE FILTER
Filed June 16, 1938      2 Sheets-Sheet 1

INVENTOR
Gustav Kjellsson
BY
ATTORNEY

June 13, 1939.  G. KJELLSSON  2,162,583

NASAL PASSAGE FILTER

Filed June 16, 1938  2 Sheets—Sheet 2

INVENTOR
Gustav Kjellsson
BY
ATTORNEY

Patented June 13, 1939

2,162,583

UNITED STATES PATENT OFFICE 2,162,583

NASAL PASSAGE FILTER

Gustav Kjellsson, Brooklyn, N. Y.

Application June 16, 1938, Serial No. 213,978

4 Claims. (Cl. 128—148)

This invention relates to new and useful improvements in a nasal passage filter.

This invention has for an object the construction of a filter for the nasal passages adapted particularly for use under conditions where the atmosphere is polluted by dust of various natures. Filters of this type are highly desirable in the building industry during alteration jobs and in many other industries.

The invention particularly proposes a filter which is of simple construction and which may readily be placed in position and maintain its position with the least amount of annoyance.

Another object of the invention resides in arranging the parts so that the filtering action will be efficient without a material loss in the air supply.

Still further the invention proposes characterizing the filter by a single helical coil spring, and cloth covering for the same, arranged so that the side walls thereof may be engaged in intimate contact with the walls of the nasal passage. For filtering material it is proposed to arrange gauze, or cotton, or alternate layers of these materials within the coiled spring.

Still further the invention proposes the construction of a filter for the health and comfort of people troubled by dust and pollen in the air. This filter is so constructed that it will clean the air of all foreign materials circulating therein and prevent them from passing into the nasal passages and irritate same.

Still further it is proposed to construct the filter in such a manner that it may be saturated with a nasal oil or similar medicant for healing and moistening the skin and mucous membranes in the nose for alleviating the effects of hay fever.

A further object of this invention is to construct the filter from a flat ring having a plurality of U-shaped members with their arms passing through openings on opposite sides of the ring and over which a cloth covering may be engaged.

Still further it is proposed to construct the nasal filter in such a manner that filtering material may be engaged into the confines of the U-shaped members on either side of the ring or on both sides thereof, as desired.

A further object of the invention is to provide for the construction of a filter characterized by a continuous piece of wire formed with a plurality of alternating bends throughout its length forming an elongated circular frame over which cloth covering is engaged and into which filtering material may be positioned.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

The nasal passage filter includes a pair of hollow cylindrical members having passages in their side walls and adapted to engage in the nasal passages. Filter elements are arranged axially through and around the hollow members and are attached or mounted into position.

Figure 1:
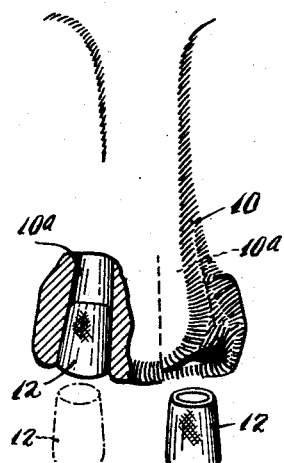
Fig. 1 is a perspective view of a nasal passage filter constructed according to this invention and shown in relation to a nose schematically illustrated.
Figure 2:
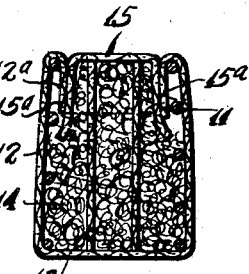
Fig. 2 is a perspective view of one of the nasal passage filters, per se.
Figure 3:
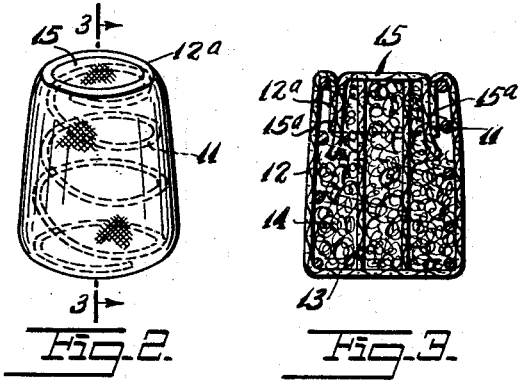
Fig. 3 is a sectional view on the line 3—3 of Fig. 2.

In the form of the invention illustrated in Figs. 1–3, a nasal passage filter is shown embodying the invention. The filter is constructed in a manner so that there are separate filter sections for each of the nasal passages. Reference numeral 10 indicates, generally, a schematic showing of a nose having nasal passages 10ᵃ. There is a filter for each nasal passage. The filter at the left is shown engaged into the nasal passage, while the one at the right is shown below the nasal passage. Each of these filters is constructed identically and consists essentially of a single coil of spring wire 11 encased within a cloth covering 12 and holding filtering material consisting of gauze 13 and cotton material 14 arranged in a desirable manner. This filtering material may be of any design or construction depending merely on taste and filtering action desired. If required, all cotton may be used or all gauze, or alternate layers of these materials.

The covering material 12 has its ends 12a bent over the top of the turn of the coil spring 11. An end covering sheet 15 serves to encase the top portion of the filter. This end covering sheet has its ends 15a bent inwards into the compass of the filter.

The filter is merely pressed into the nasal passage and serves to filter the air passing therethrough.

Figure 5:
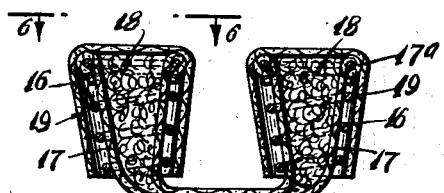
Fig. 5 is a transverse vertical sectional view of the nasal passage filter per se.
Figure 4:
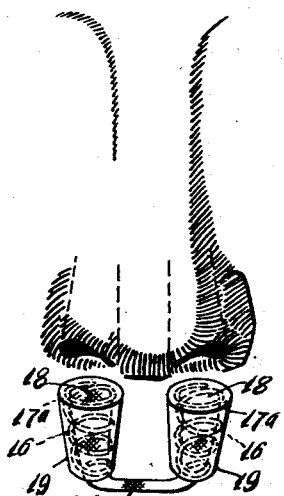
Fig. 4 is a similar view of Fig. 1, but illustrating another form of the invention.
Figure 6:
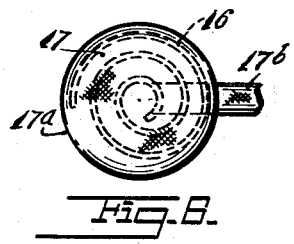
Fig. 6 is a fragmentary top plan view looking in the direction of the line 6—6 of Fig. 5.

In the form of the invention illustrated in Figs. 4-6 inclusive, each of the hollow frusto-conical members includes a helical spiral spring 16. A tubular filter cloth 17 consists essentially of a tubular piece of filter cloth. This cloth is engaged axially through the small ends of the helical spiral springs. The ends 17a of the filter cloth are bent around the large end coils of the springs so as to encase these coils. These bent around end portions of the filter are held in position by lines of stitches 18. The arrangement is such that the conical side walls of the members will serve to correspondingly hold the filter. Between the conical members the filter cloth has central portion 17b which serves to join the members together in a unit. This central portion 17b will engage beneath the dividing wall of the nasal passages.

A cloth covering 19 is engaged over each of the helical spiral springs 16. These covers assume the same shapes as the springs which are adapted to cover the springs and so protect the walls of the nasal passage.

The nasal passage filter is engaged in position by having the large diameters of the helical spiral springs at the top. These large diameters will serve to engage the walls of the nasal passages and hold the filter in proper position. The tapering sides will serve to hold the side portions of the filter cloth spaced from the walls of the nasal passage and so a comparatively large filtering area is obtained.

Figure 7:
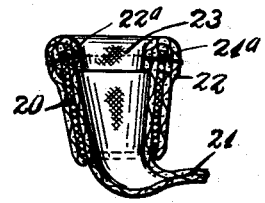
Fig. 7 is a fragmentary sectional view of a nasal passage filter constructed according to a modification of this invention.
Figure 8:
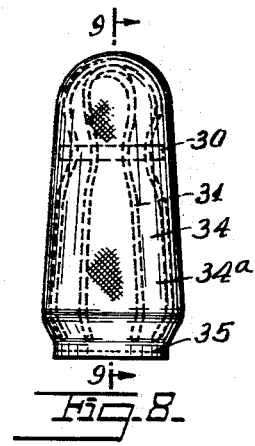
Fig. 8 is an elevational view of a nasal passage filter constructed according to a still further modification of the invention.
Figure 9:
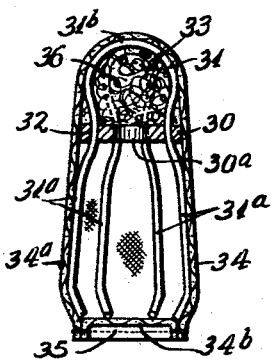
Fig. 9 is an enlarged sectional view on the line 9—9 of Fig. 8.

In Fig. 7 a modification of the invention has been illustrated which distinguishes from the prior form merely in the construction of each nasal member. According to this form of the invention there is a screen material member 20 of frusto-conical form. A tubular filter cloth 21 engages into the small end of this member. The end portion 21 of the tubular filter member is engaged over the edge of the large diameter of the member. A cheese cloth covering member 22 is engaged over the outer surface of the conical member 20. The top ends 22a of this cheese cloth covering are bent inwards. The parts are held in this position by stitches 23. In other respects this form of the invention is similar to the previous form and similar parts may be identified by corresponding reference numerals.

According to the modification of the invention shown in Figs. 8-11 inclusive the nasal passage filter includes a flat ring 30 having a passage 30a extending through the center thereof. This ring may be constructed from composition material, metal, wood, or any other similar material. A plurality of U-shaped members 31, constructed from piano wire or other fine wire, have their arms 31a passing through openings 32 formed on opposite sides of the ring 30. The intermediate portions 31b of the U-shaped members 31 pass each other on one side of the ring 30 forming a dome 33.

A cloth covering 34 is engaged over the outside of the U-shaped members 31 and the outer periphery of the ring 30 and is adapted to entirely encase these members. The cloth covering 34 consists of a tubular portion 34a engaged over the U-shaped members 31 and having its bottom end closed by means of a set-in portion 34b. The adjacent edges of the tubular portion 34a and the set-in portion 34b are held in position by means of stitches 35.

Filtering material 36 in the form of cotton or similar material is engaged into the dome 33 and rests on the adjacent face of the ring 30. This filtering material 36 may be saturated with a nasal oil or similar medicant if so desired for moistening and healing the skin and mucous membranes to alleviate a hay fever condition.

Figure 10:
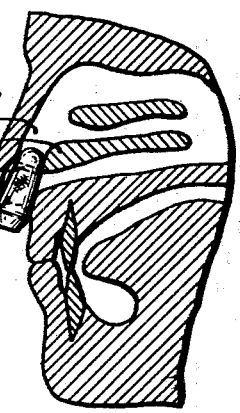
Fig. 10 is a cross sectional view of one's nose showing a filter constructed according to this invention in position therein.

As shown in Fig. 10, the nasal filter is adapted to be slipped into the nasal openings with the ring 30 engaged between the inner wall of the nose and the adjacent wall of the mucous membranes 37. The ring 30 normally extends across the nasal passage 38 between the wall and the mucous membranes. In this position the air entering through the nose is capable of passing outwards through the side of the filter to pass beneath the mucous membranes 37. Some of the air will pass through the openings 30a through the filtering material 36 and out through the top of the filter and circulate past the mucous membranes. The filter material 36 will act to filter those foreign materials from the air which have passed through the cloth covering 37 to prevent them from coming in direct contact with the mucous membranes.

Figure 12:
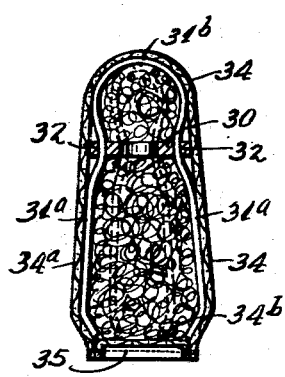
Fig. 12 is a view similar to Fig. 9 illustrating a further modification of the invention.
Figure 11:
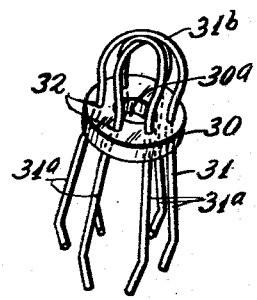
Fig. 11 is a perspective view of the device illustrated in Fig. 8.

According to the modification shown in Fig. 12 the construction of the filter is similar to that previously described, except for the provision of filtering material 36a between the bottom end of the cloth covering 34 and the bottom face of the ring 30. In this form of the invention the filtering material is on both sides of the ring 30 within the confines of the U-shaped members 31. In other respects this form of the invention is similar to the previous form.

Figure 13:
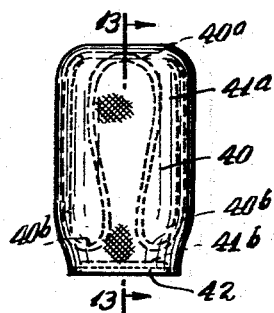
Fig. 13 is a view similar to Fig. 8 but illustrating another modification of the invention.
Figure 14:
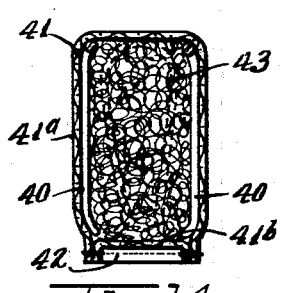
Fig. 14 is an enlarged sectional view on the line 14—14 of Fig. 13.
Figure 15:
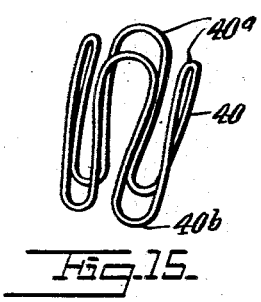
Fig. 15 is a perspective view of the wire frame per se.

According to the modification shown in Figs. 13 and 15 the nasal passage filter includes a continuous piece of wire 40 formed with a plurality of alternating bends 40a and 40b throughout its entire length forming an elongated circular frame. A cloth covering 41 is engaged on the outer side of the frame formed by the wire 40 and is adapted to contact the inner wall of the nasal passage when the filter is inserted into the nasal passage. This cloth covering consists of an elongated tubular portion 41a slipped over one end of the frame and having its bottom end closed by an inset portion 41b held in position by means of stitches 42. Filtering material 43 is inserted into the frame formed by the wire 40 and is adapted to be saturated with a nasal oil or similar medicant for assisting in alleviating a hay fever condition.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A nasal passage filter, comprising a flat ring, a plurality of U-shaped members having their arms passing through openings on opposite sides of said ring and their intermediate portions passing each other on one side of said ring forming a dome, a cloth covering engaged over the outside of said members and adapted to contact the inner wall of a nasal passage, and filtering material engaged into said dome and resting on the adjacent face of said ring.

2. A nasal passage filter, comprising a flat ring, a plurality of U-shaped members having their arms passing through openings on opposite sides of said ring and their intermediate portions passing each other on one side of said ring forming a dome, a cloth covering engaged over the outside of said members and adapted to contact the inner wall of a nasal passage, and filtering material engaged into said dome and resting on the adjacent face of said ring, said flat ring being constructed from composition, wood or similar material and having a centrally disposed opening through which the air entering at the bottom of the filter is adapted to pass for passing through the filtering material.

3. A nasal passage filter, comprising a flat ring, a plurality of U-shaped members having their arms passing through openings on opposite sides of said ring and their intermediate portions passing each other on one side of said ring forming a dome, a cloth covering engaged over the outside of said members and adapted to contact the inner wall of a nasal passage, and filtering material engaged into said dome and resting on the adjacent face of said ring, said filtering material being adapted to be saturated with a nasal oil or similar medicant for assistant in alleviating a hay fever condition.

4. A nasal passage filter, comprising a flat ring, a plurality of U-shaped members having their arms passing through openings on opposite sides of said ring and their intermediate portions passing each other on one side of the ring forming a dome, a cloth covering engaged over the outside of said members and adapted to contact the inner wall of a nasal passage, and filtering material within the confines of said U-shaped members on both sides of said ring.

GUSTAV KJELLSSON.